(12) United States Patent
Bugh

(10) Patent No.: US 7,179,027 B2
(45) Date of Patent: Feb. 20, 2007

(54) TOOL FOR POSITIONING TEMPLATES WITH RESPECT TO CURVED RAIL

(76) Inventor: Roger E. Bugh, 7137 Deer Trail Ave., NE., North Canton, OH (US) 44721

( * ) Notice: Subject to any disclaimer, the term of this patent is extended or adjusted under 35 U.S.C. 154(b) by 329 days.

(21) Appl. No.: 10/820,256

(22) Filed: Apr. 8, 2004

(65) Prior Publication Data

US 2004/0200544 A1    Oct. 14, 2004

Related U.S. Application Data

(60) Provisional application No. 60/461,567, filed on Apr. 9, 2003.

(51) Int. Cl.
*B27C 5/10* (2006.01)
(52) U.S. Cl. .............. 409/178; 408/115 R; 409/179; 144/144.1; 144/144.51
(58) Field of Classification Search .......... 409/132, 409/178, 179, 181, 182, 175; 408/115 R, 408/103; 144/136.95, 154.5, 144.1, 144.51, 144/137
See application file for complete search history.

(56) References Cited

U.S. PATENT DOCUMENTS

| | | | | |
|---|---|---|---|---|
| 1,846,199 A | * | 2/1932 | Hall ................. | 144/144.51 |
| 2,214,686 A | * | 9/1940 | Weedy ............. | 408/72 R |
| 2,417,539 A | * | 3/1947 | Aronson .......... | 408/72 R |
| 3,456,555 A | * | 7/1969 | Dunlap ............. | 409/179 |
| 3,547,002 A | * | 12/1970 | Walter .............. | 409/101 |
| 3,908,510 A | * | 9/1975 | Koskolos et al. .. | 409/182 |
| 4,330,228 A | * | 5/1982 | Beyl ................. | 408/112 |
| 5,318,394 A | * | 6/1994 | Pierce et al. ...... | 408/72 B |
| 5,832,977 A | * | 11/1998 | Hampton ......... | 144/144.51 |
| 6,220,317 B1 | * | 4/2001 | Martin et al. .... | 144/372 |

FOREIGN PATENT DOCUMENTS

GB    698643    * 10/1953 ............ 408/72 R

* cited by examiner

*Primary Examiner*—Daniel W. Howell
(74) *Attorney, Agent, or Firm*—Zollinger & Burleson Ltd.

(57) ABSTRACT

A tool for positioning a plurality of templates with respect to a curved rail includes a flexible spine that carries a plurality of templates. Each of the templates defines an opening adapted to guide a cutting tool to form a picket hole in the rail. The templates are evenly spaced along the longitudinal direction of the flexible spine so that the picket holes are evenly spaced when cut. A clamp may be associated with each template to hold the tool with respect to the rail.

13 Claims, 9 Drawing Sheets

TOOL FOR POSITIONING TEMPLATES WITH RESPECT TO CURVED RAIL

CROSS REFERENCE TO RELATED APPLICATIONS

This application claims priority from U.S. patent application Ser. No. 60/461,567 filed Apr. 9, 2003; the disclosure of which is incorporated herein by reference.

BACKGROUND OF THE INVENTION

1. Technical Field

The present invention generally relates to methods and tools used to form the picket holes in curved fence rails. More particularly, the present invention relates to a flexible tool that automatically adjusts to the curvature of the rail to automatically position a plurality of templates at the locations for the picket holes.

2. Background Information

Low maintenance vinyl fences and vinyl decking are becoming increasingly popular as their appearance approaches traditional wood structures. These structures generally have top and bottom rails that extends between vertical posts. A plurality of spaced parallel pickets are connected to the top and bottom rails and are evenly spaced between the posts. Picket holes must be cut in the upper surface of the bottom rail and in the lower surface of the top rail to receive the pickets. In order to maintain parallel and evenly spaced pickets, the picket holes must be carefully planned and cut. When the top and bottom rails are straight, the planning and cutting is not too difficult. A router may be used with a simply template to cut the openings along the longitudinal centerline of the rails.

Structures with curved rails are also becoming increasingly desired given their aesthetic features and their ability to simulate traditional wooden structures. Those skilled in the art of vinyl structures have found the task of cutting picket holes in curved vinyl rails difficult. The radii of curved vinyl rails varies because of the material properties and methods of forming the curved rails. The different radii prevent a fixed template from being used to locate the picket holes. As such, the location of each picket hole must be measured manually. Once the hole location is marked, a template is position and a cutting tool, such as a router, is used to form the hole. Although this process is effective, the art desires a method and a tool for quickly and easily laying out and cutting all the picket holes in a curved rail.

BRIEF SUMMARY OF THE INVENTION

The invention provides a tool that is used to locate the picket holes on a curved fence rail. The tool automatically adjusts to the curvature of the rail while automatically positioning a plurality of templates at the proper locations for the picket holes. The tool generally includes a flexible spine with a plurality of templates mounted to the spine. In one embodiment of the invention, the tool includes a clamp aligned with each template to securely hold the curved rail with respect to the templates.

The invention also provides a method for forming the picket holes in a curved rail wherein the curved rail is slid into a flexible tool that automatically adjusts its curvature to the curvature of the rail. The method includes the step of fixing the position of the tool with respect to the rail and forming the picket holes in the rail.

BRIEF DESCRIPTION OF THE SEVERAL VIEWS OF THE DRAWINGS

Similar numbers refer to similar parts throughout the specification.

DETAILED DESCRIPTION OF THE INVENTION

The two preferred embodiments of the tool of the invention are indicated generally by the numerals 100 and 102 in the accompanying drawings. Each tool 100 and 102 is adapted to automatically adjust itself to the curvature of a rail 104 that is placed within tool 100 or 102. Each tool 100 and 102 is also adapted to automatically position a plurality of templates 106 with respect to rail 104 so that the picket holes may be cut into curved rail 104 without excessive, time consuming measuring.

Figure 1:
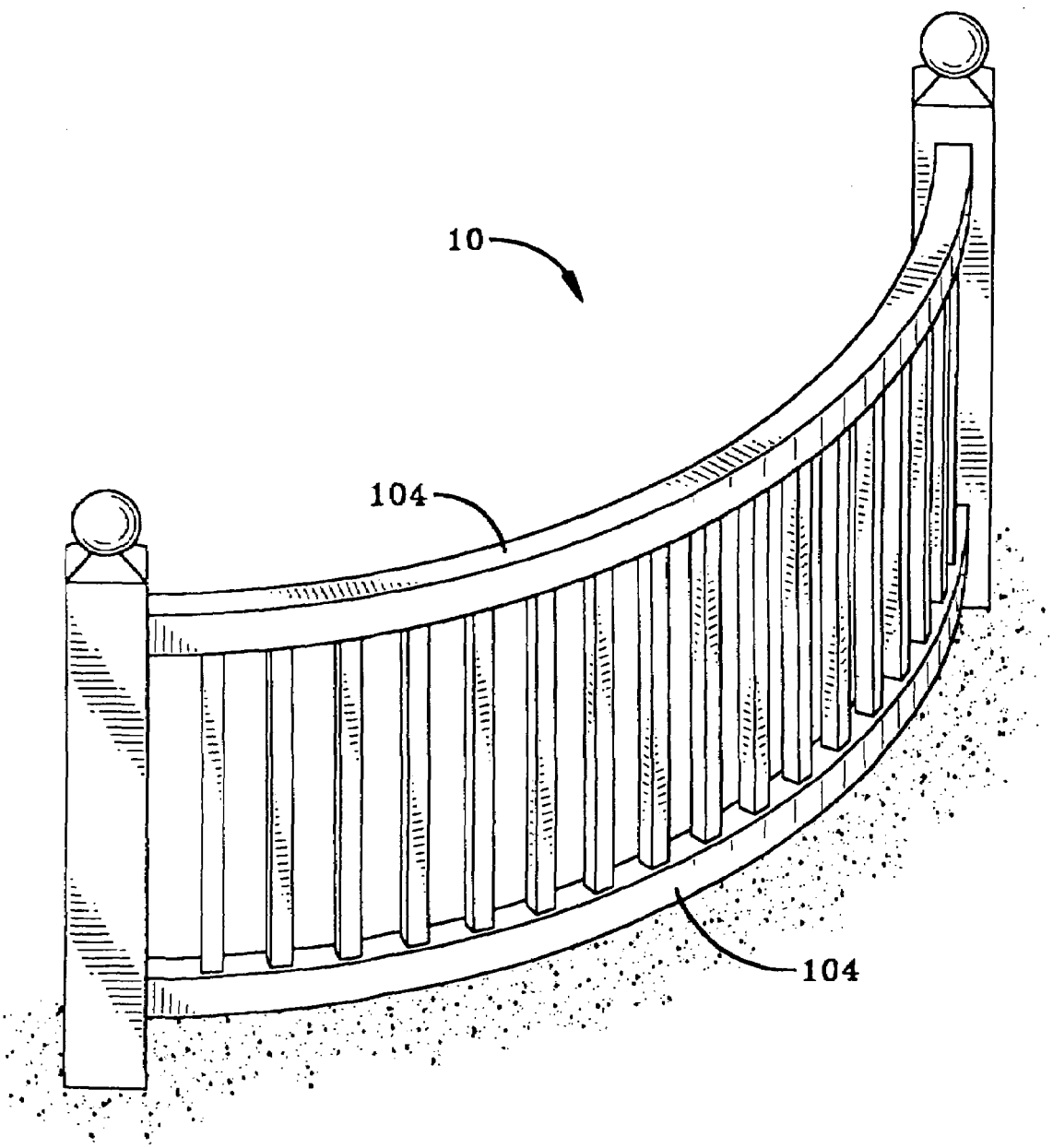
FIG. 1 is a perspective view of a curved fence section having a pair of curved fence rails disposed between a pair of fence posts.
Figure 2:
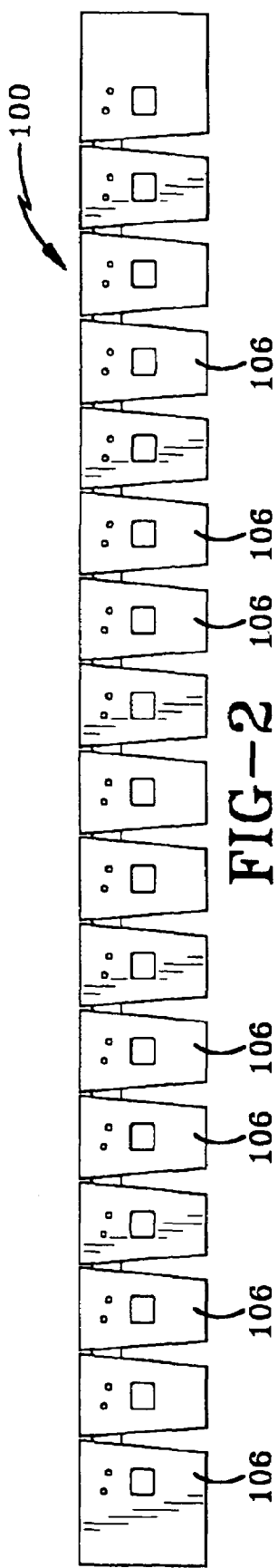
FIG. 2 is a top plan view of the first embodiment of the tool of the present invention.
Figure 3:
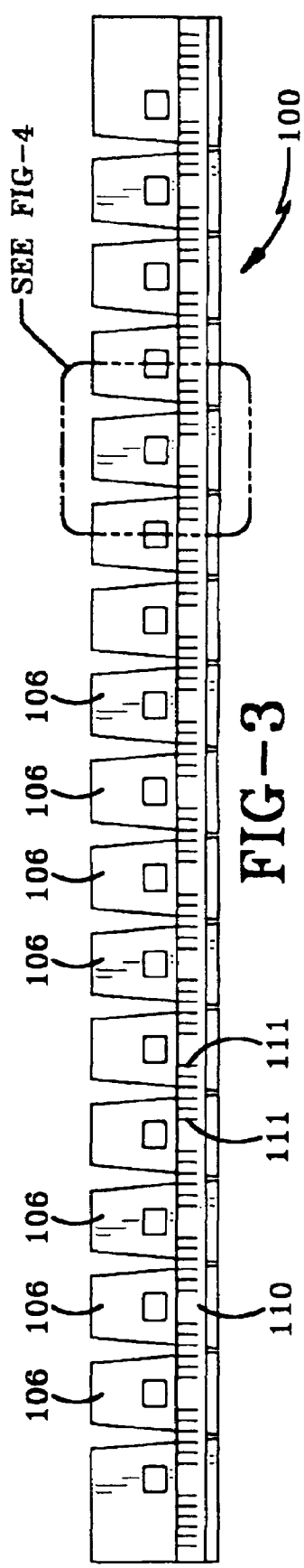
FIG. 3 is a bottom plan view of the first embodiment of the tool of the present invention.
Figure 4:
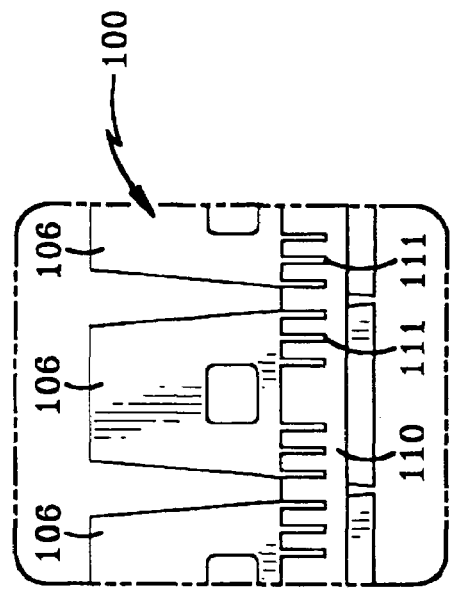
FIG. 4 is an enlarged view of the encircled portion of FIG. 3.
Figure 5:
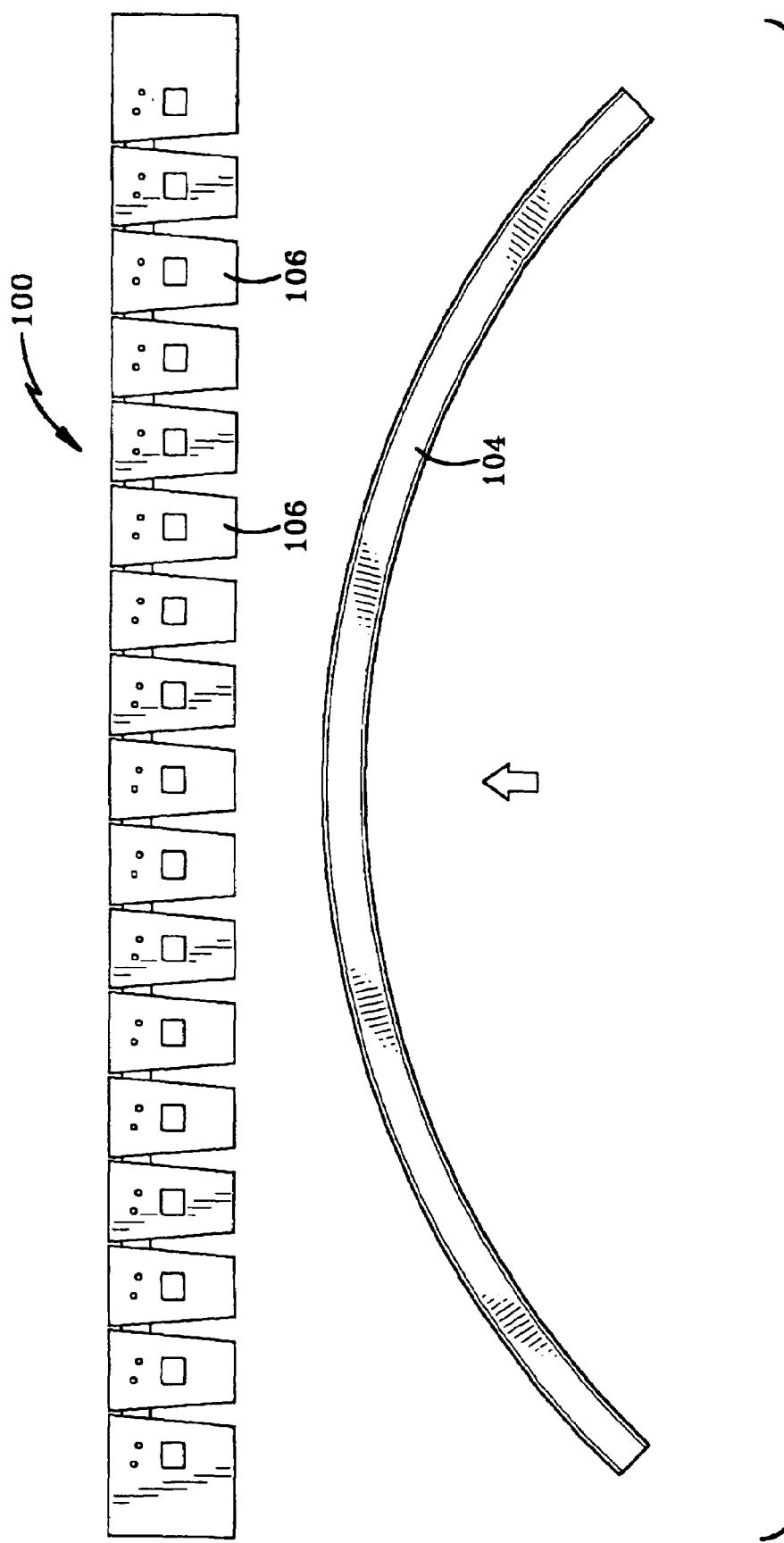
FIG. 5 is a top plan view of the first embodiment of the tool and a curved rail.
Figure 9:
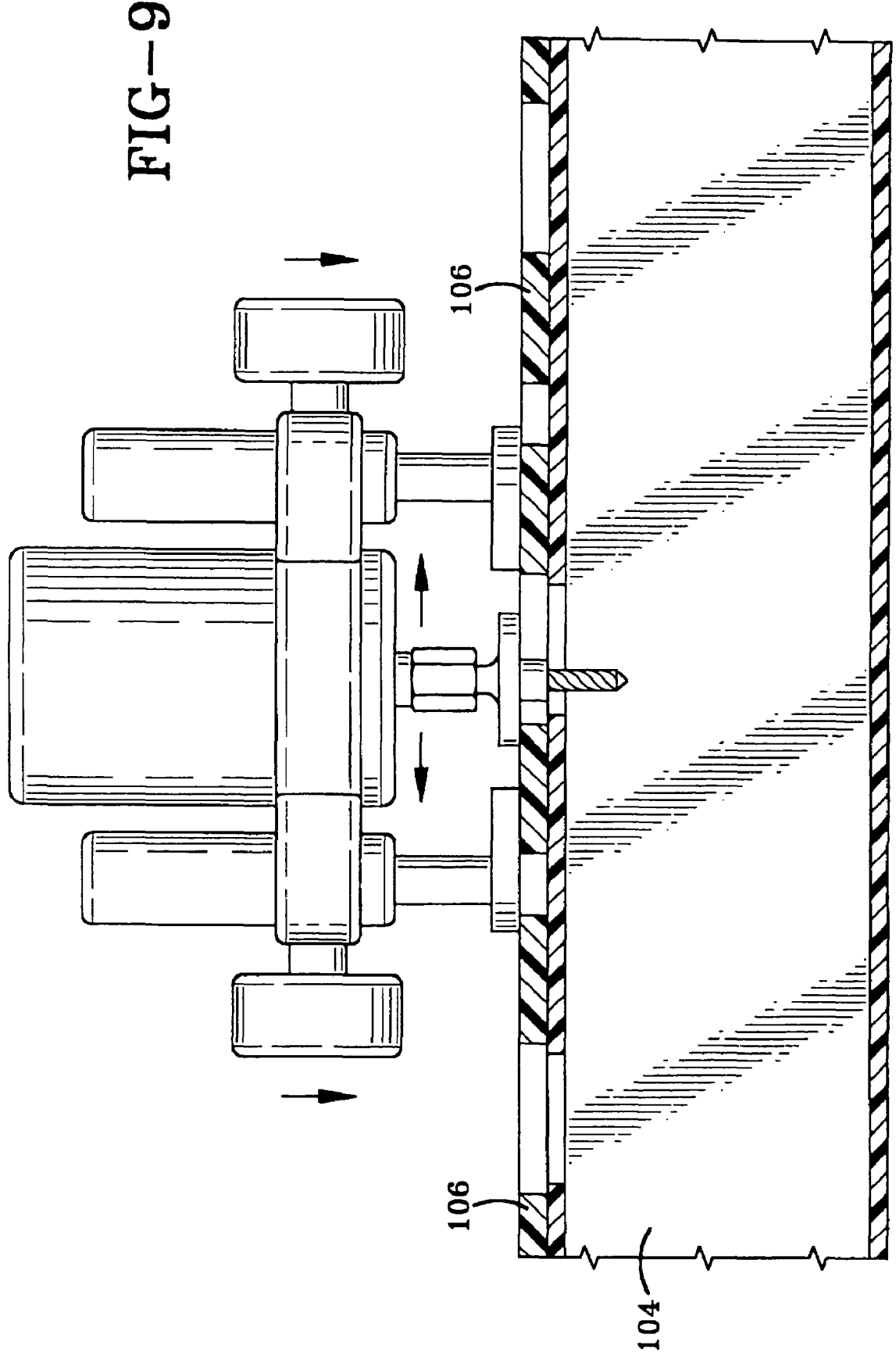
FIG. 9 is a view similar to FIG. 8 showing the cutting tool forming the picket hole.
Figure 10:
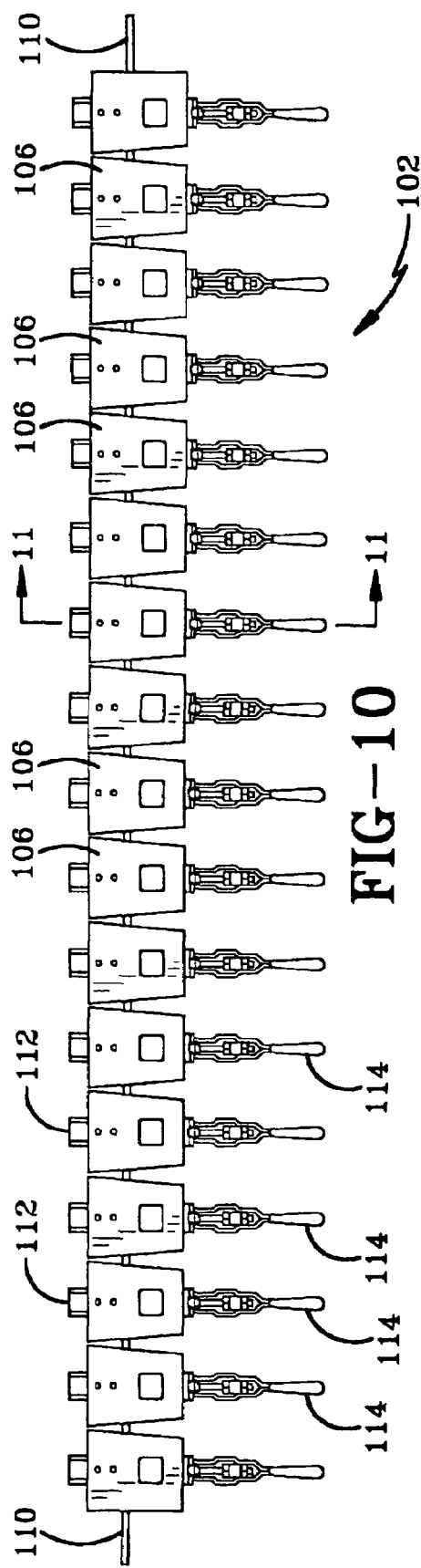
FIG. 10 is a top plan view of the second embodiment of the tool of the present invention.

Each template 106 may be a locating template that is used to mark the picket hole location or a cutting template that defines an opening sized and shaped to receive an appropriate cutting element—such as a router bit—that is designed to cooperate with the opening to cut a picket holes in a surface of rail 104. In the preferred embodiment of the invention, each opening on each template 106 is sized to cooperate with the collar on a router bit to properly position the router bit (FIG. 9) to cut a perfect opening that receives the end of a picket in a fence 10 (FIG. 1). Each template 106 is designed for the picket that is intended to be used with rail 104. Different templates 106 are used for different pickets. As such, different tools 100 or 102 may be designed for use with different pickets. Further, different tools 100 or 102 may be designed for use with different picket spacing. Tool 100 and 102 is, however, designed to work with endless degrees of curvature between the upper and lower limits of the tool. In another embodiment of the invention, the positions of the templates with respect to the tool are adjustable so that the tool may be set up for different picket spacing.

Figure 7:
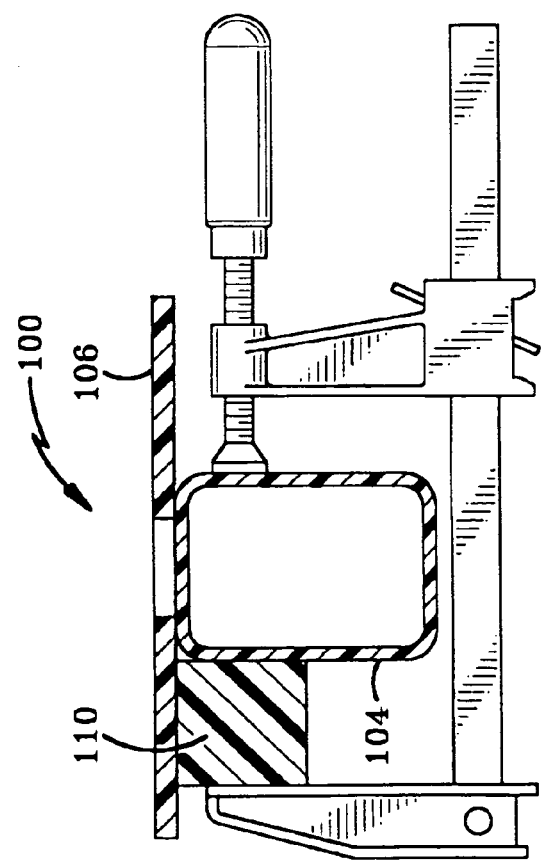
FIG. 7 is a section view taken along line 7—7 of FIG. 6.
Figure 8:
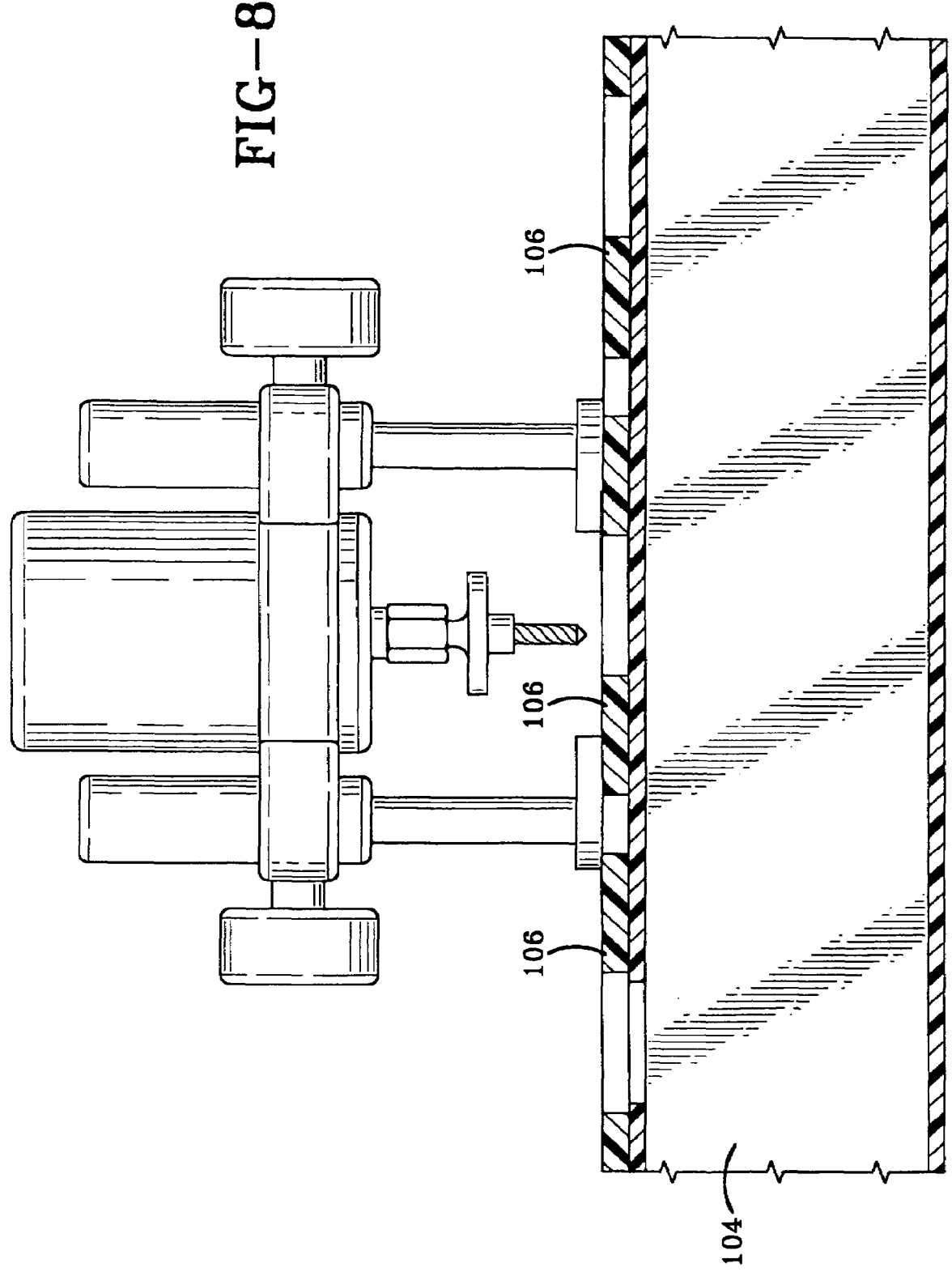
FIG. 8 is a section view taken along line 8—8 of FIG. 6 showing a cutting tool ready to cut a picket hole.
Figure 14:
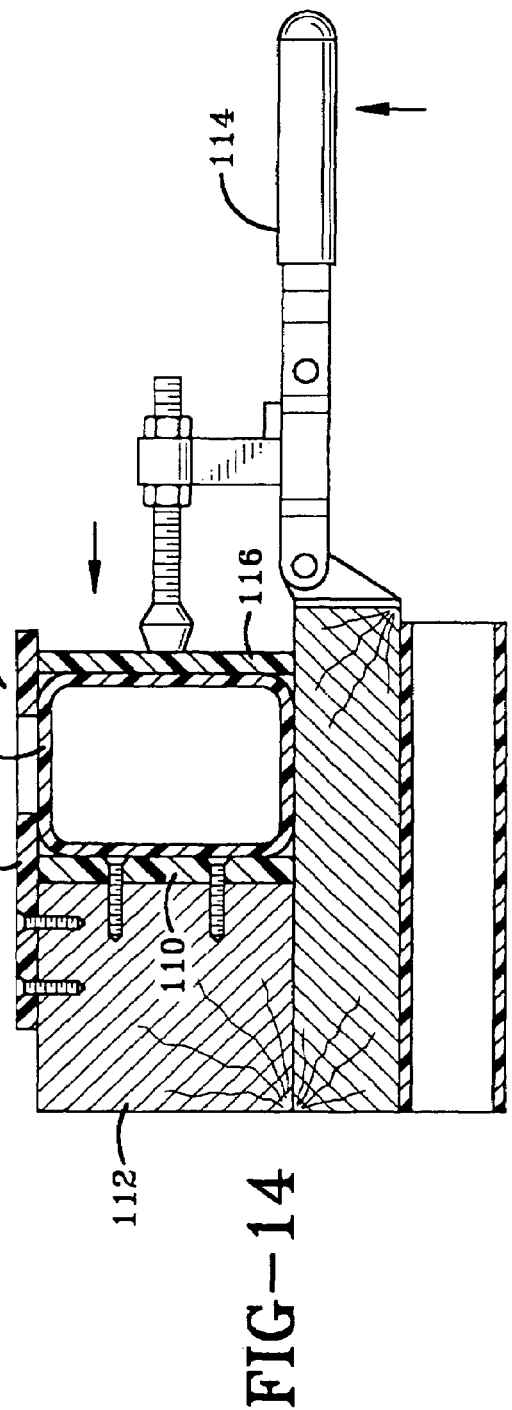
FIG. 14 is a section view taken along line 14—14 of FIG. 13.

Each tool 100 and 102 includes a flexible spine 110 that carries templates 106 such that the opening in template 106 is properly positioned with respect to rail 104. The opening in each template may be centered with respect to the cross sectional width of rail 104 as shown in FIGS. 7 and 14.

In tool 100, spine 110 defines a plurality of spaced slots 111 that increase the flexibility of spine 110. In cross section, the spine on tool 100 has a height equal to its width and may be 1½ inch by 1½ inch in cross section. In this embodiment, the spine acts as its own clamp support as shown in FIG. 7 such that rail 104 is clamped against spine 110 with a plurality of clamps that are removed from tool 100 when all of the holes are cut in rail 104. In tool 102, spine 110 has a thin width compared to its height in cross section. The thin width allows spine 110 to bend without the need for slots 111. In both embodiments, spine 110 may be fabricated for a flexible material such as plastic lumber.

Figure 11:
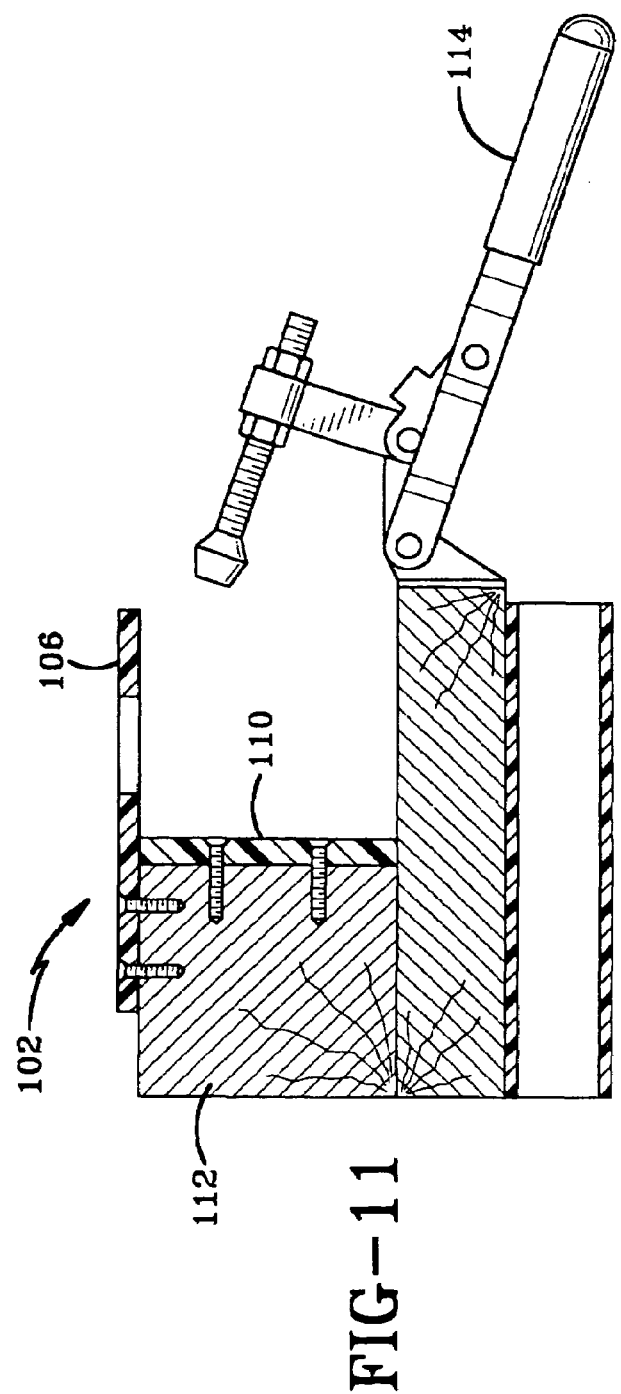
FIG. 11 is a section view taken along line 11—11 of FIG. 10.
Figure 12:
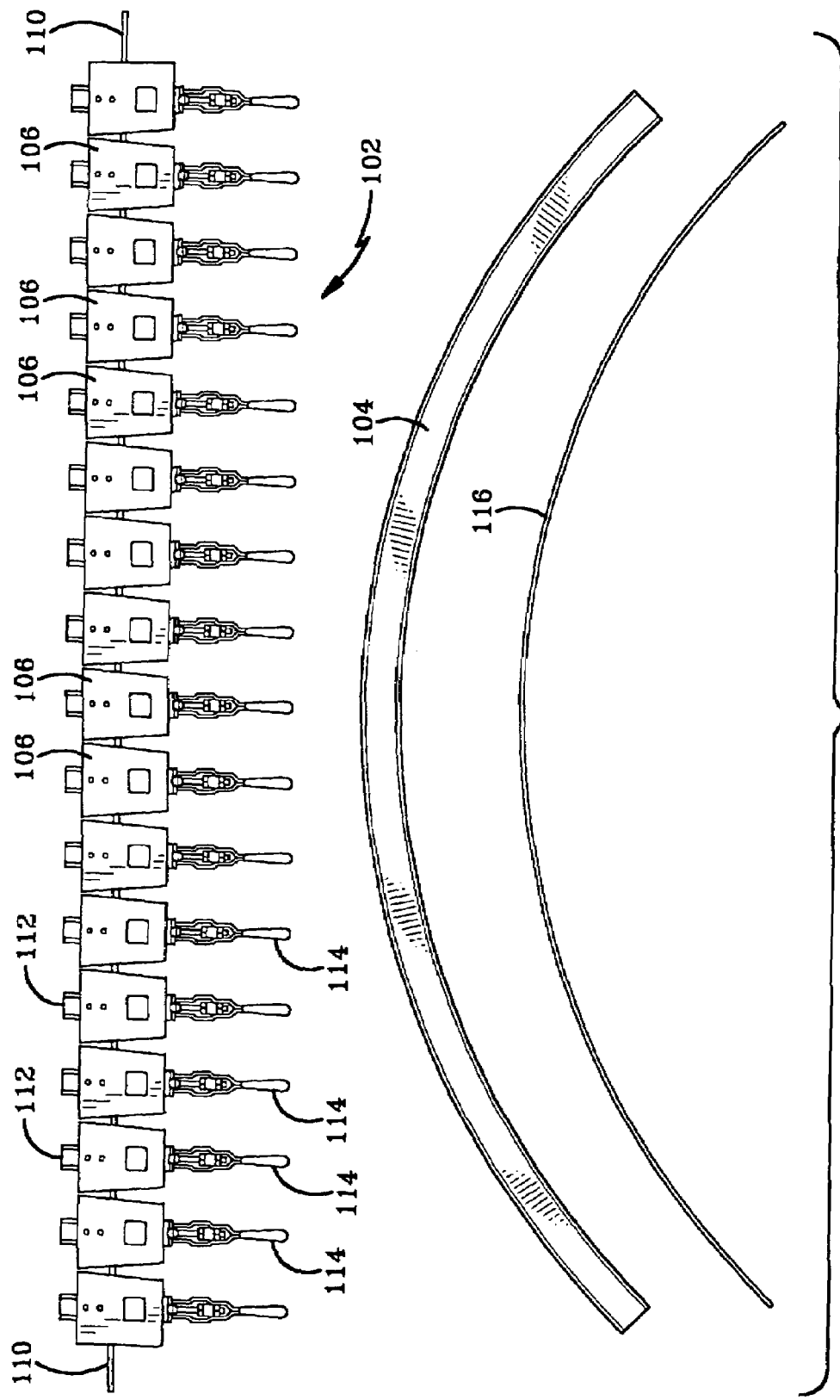
FIG. 12 is a top plan view of the second embodiment of the tool and a curved rail.

In the second embodiment, a clamp support 112 is attached to spine 110 at each template 106. A clamp 114 is attached to each clamp support 112 as shown in FIG. 11 with a portion of spine 110 being disposed between clamp 114 and clamp support 112. Clamps 114 may be securely mounted (i.e.: with threaded fasteners) to supports 112 such that clamps 114 remain in place after the holes are formed in rail 104. The clamping force of clamp 114 is adjustable to accommodate variations in rail 104 thickness.

In tool 102, a flexible cover 116 is disposed between each clamp 114 and spine 110 to protect rail 104 and spread the clamping force of clamps 114 to a wider area of rails 104. Flexible cover 116 may also be fabricated from flexible lumber. Cover 116 has a length at least as long as the span of clamps 114 and may have a length equal to or greater than spine 110.

Figure 6:
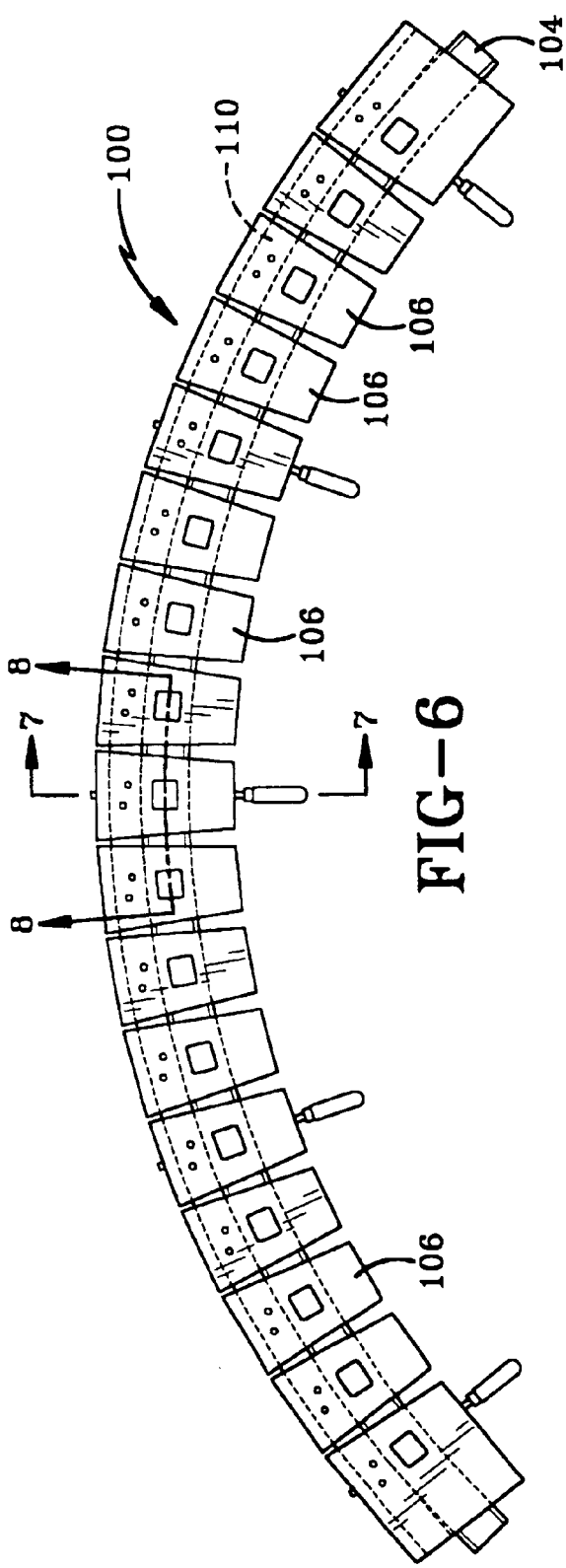
FIG. 6 is a top plan view of the first embodiment of the tool with a curved rail clamped into the tool and ready for cutting.
Figure 13:
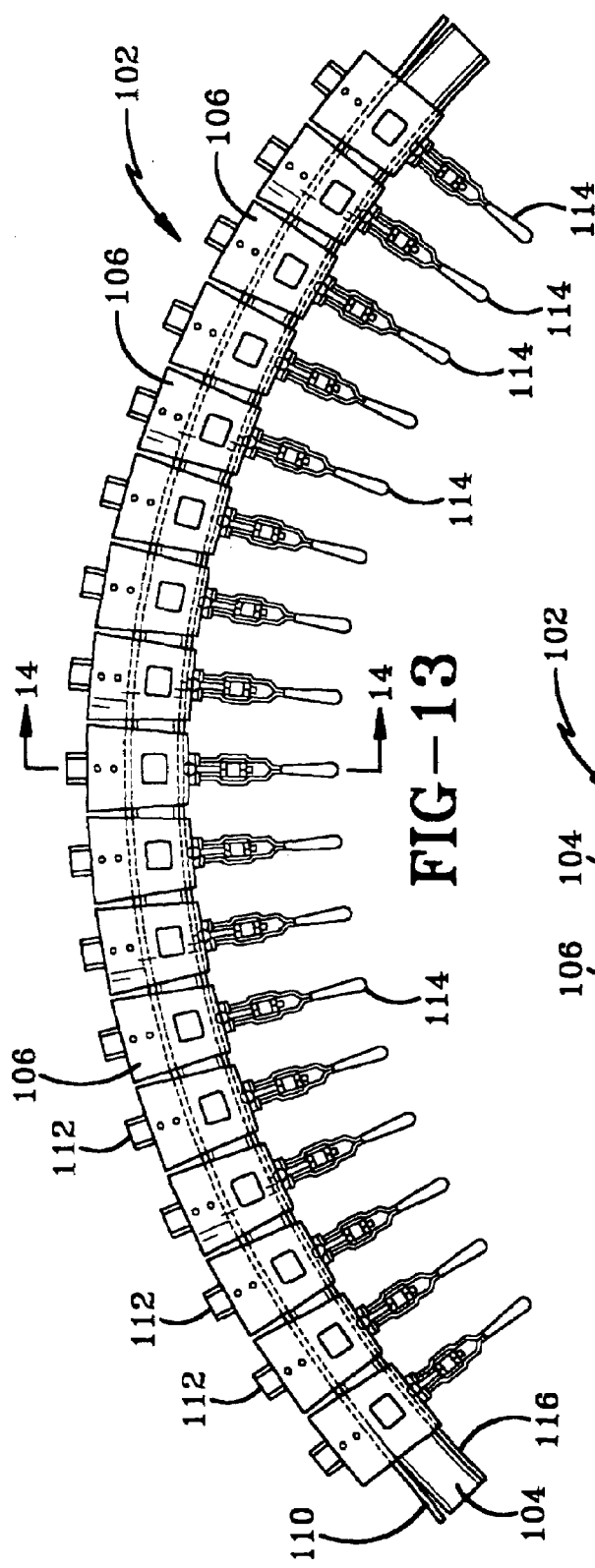
FIG. 13 is a top plan view of the first embodiment of the tool with a curved rail clamped into the tool and ready for cutting.

Each template 106 may have angled sidewalls or angled corners that allow templates 106 to pivot toward each other when a sharply curved rail 104 is inserted into tool 100 or 102 as shown in FIGS. 6 and 13. The angles prevent the templates 106 from interfering with each other.

In the two embodiments of the invention shown in the drawings, the distance between each template 106 is fixed and the spacing between the template 106 hole and the spine 110 is fixed. In other embodiments of the invention, these distances may be adjustable by providing the templates with adjustable connections.

In use, the person needing a curved fence section 10 first forms a pair of rails 104 into the desired curve by know bending techniques. The user then inserts curved rail 104 into tool 100 or 102. In tool 100, the person bends tool 100 around curved rail 104 and clamps tool 100 in place as shown in FIGS. 6 and 7. In tool 102, the user slides rail 104 into tool 102 and allows tool 102 to automatically accommodate the curvature of rail 104. The user then positions one end of tool 100 or 102 with respect to rail 104 to automatically position templates 106 with respect to rail 104. Tools 100 and 102 also allow the person cutting the holes to view the entire layout before cutting. This overview gives the user the chance to eliminate layout mistakes that would otherwise result in a scrapped piece of material. Each tool 100 and 102 may be used on a straight rail 104 having an infinite radius of curvature to a rail 104 having a radius of curvature that is small enough to cause templates 106 to interfere with each other.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tool for positioning a plurality of templates with respect to a curved rail having a curvature; the tool comprising:
   a flexible spine having a longitudinal direction; the flexible spine adapted to conform to the curvature of the curved rail;
   a plurality of templates connected to the flexible spine; each of the templates defining an opening adapted to guide a cutting tool to form a picket hole in the rail;
   the templates being evenly spaced along the longitudinal direction of the flexible spine;
   a plurality of clamps adapted to hold the curved rail against the flexible spine; and
   a flexible cover disposed between the clamps and the flexible spine.

2. A tool for positioning a plurality of templates with respect to a curved rail having a curvature; the tool comprising:
   a flexible spine having a longitudinal direction; the flexible spine adapted to conform to the curvature of the curved rail;
   a plurality of templates connected to the flexible spine: each of the templates defining an opening adapted to guide a cutting tool to form a picket hole in the rail;
   the templates being evenly spaced along the longitudinal direction of the flexible spine; and
   a clamp aligned with each of the templates.

3. The tool of claim 2, further comprising a clamp support connected to the flexible spine and aligned with each of the clamps.

4. The tool of claim 3, further comprising a flexible cover disposed between the clamps and the flexible spine.

5. The tool of claim 2, wherein the clamps are carried by the flexible spine; the clamps being adapted to hold the curved rail against the flexible spine.

6. The tool of claim 5, further comprising a clamp support connected to the flexible spine and aligned with each of the clamps.

7. A tool for positioning a plurality of templates with respect to a curved rail having a curvature; the tool comprising:
   a flexible spine having a longitudinal direction; the flexible spine adapted to conform to the curvature of the curved rail;
   a plurality of templates connected to the flexible spine; each of the templates defining an opening adapted to guide a cutting tool to form a picket hole in the rail;
   the templates being evenly spaced along the longitudinal direction of the flexible spine; and
   each of the templates has angled sidewalls.

8. A tool for positioning a plurality of templates with respect to a curved rail having a curvature; the tool comprising:
   a flexible spine having a longitudinal direction; the flexible spine adapted to conform to the curvature of the curved rail; the flexible spine having a top surface and a front surface;

a plurality of templates connected to the top surface of the flexible spine and extending over the front surface of the spine; each of the templates defining an opening adapted to guide a cutting tool to form a picket hole in the rail; the templates remaining in a single planar reference plane when the spine is conformed to the curvature of the curved rail;

a plurality of clamps connected to the spine; each of the clamps adapted to force the rail toward the front surface of the spine; and a flexible cover disposed between the clamps and the flexible spine; the clamps adapted to force the flexible cover against the rail.

9. The tool of claim 8, wherein each of the templates has angled sidewalls.

10. The tool of claim 9, wherein the templates are evenly spaced along the spine.

11. The tool of claim 8, wherein a clamp is aligned with each of the cutting templates.

12. The tool of claim 11, further comprising a clamp support connected to the flexible spine and aligned with each of the clamps.

13. A tool for positioning a plurality of templates with respect to a curved rail having a curvature; the tool comprising:

a flexible spine having a longitudinal direction; the flexible spine adapted to conform to the curvature of the curved rail; the flexible spine having a top surface and a front surface;

a plurality of templates connected to the top surface of the flexible spine and extending over the front surface of the spine; each of the templates defining an opening adapted to guide a cutting tool to form a picket hole in the rail; the templates remaining in a single planar reference plane when the spine is conformed to the curvature of the curved rail;

a plurality of clamps connected to the spine; each of the clamps adapted to force the rail toward the front surface of the spine; and each of the template openings has a center; the centers of the openings being equally spaced from the front surface of the spine.

* * * * *